United States Patent [19]

Herr et al.

[11] 4,272,764
[45] Jun. 9, 1981

[54] SELF CONTAINED HEAD MOUNTABLE SLEEP INHIBITING DEVICE

[75] Inventors: Myron R. Herr; Austin E. Elmore, both of Scottsdale, Ariz.

[73] Assignee: Oliver A. Miller, Scottsdale, Ariz.; a part interest

[21] Appl. No.: 111,711

[22] Filed: Jan. 14, 1980

[51] Int. Cl.³ ............................................. G08B 21/00
[52] U.S. Cl. .................................... 340/575; 340/576
[58] Field of Search ............... 340/571, 573, 575, 576; 180/272, 279

[56] References Cited

U.S. PATENT DOCUMENTS

| 2,713,159 | 7/1955  | Morrison | 340/575 |
| 2,910,679 | 10/1959 | Baldwin  | 340/575 |
| 3,076,186 | 1/1963  | Greene   | 340/575 |
| 3,208,062 | 9/1965  | Gregory  | 340/575 |
| 3,906,478 | 9/1975  | Smey     | 340/575 |
| 3,999,177 | 12/1976 | Greene   | 340/575 |

FOREIGN PATENT DOCUMENTS 716445 10/1954 United Kingdom ..................... 340/575

Primary Examiner—Alvin H. Waring
Attorney, Agent, or Firm—Warren F. B. Lindsley

[57] ABSTRACT

Self contained head mountable sleep inhibiting device comprising a container having two interfitting parts for housing the electrical and mechanical components of the device and employing an L-shaped clamp member pivotally mounted at the intersection of the legs of the clamp on a corner of the housing. The clamp firmly grips the stem of glasses or the rim or band of a hat for ease in mounting the device on a user.

6 Claims, 7 Drawing Figures

U.S. Patent  Jun. 9, 1981  4,272,764
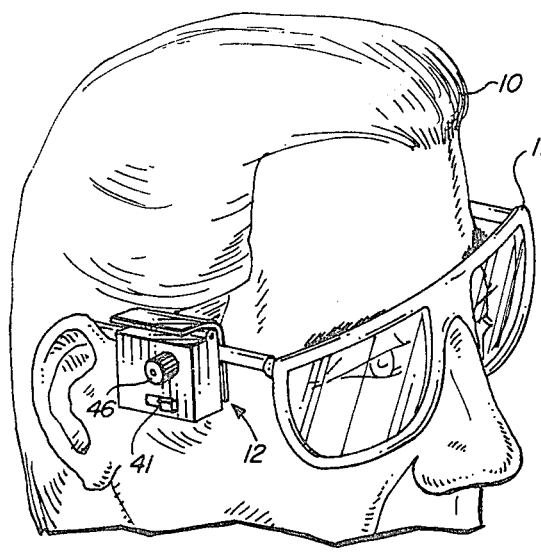
FIG-1
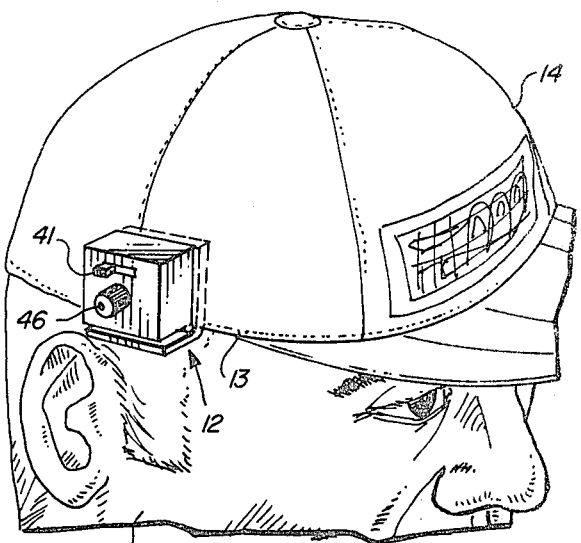
FIG-2
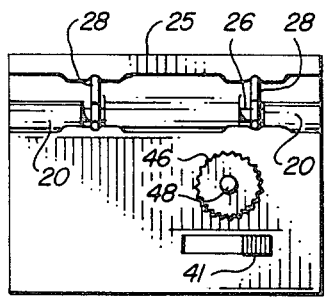
FIG-3
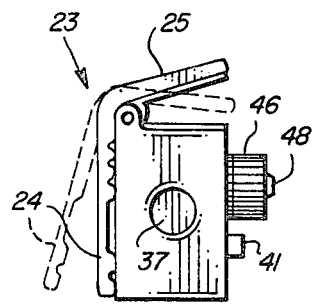
FIG-4
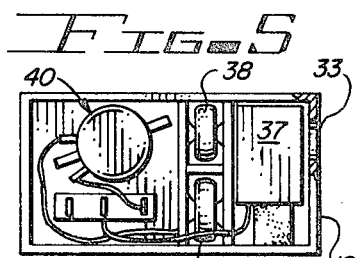
FIG-5
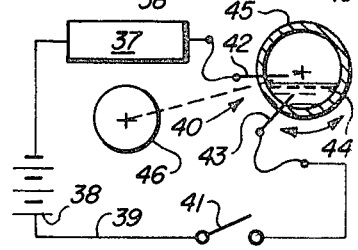
FIG-7
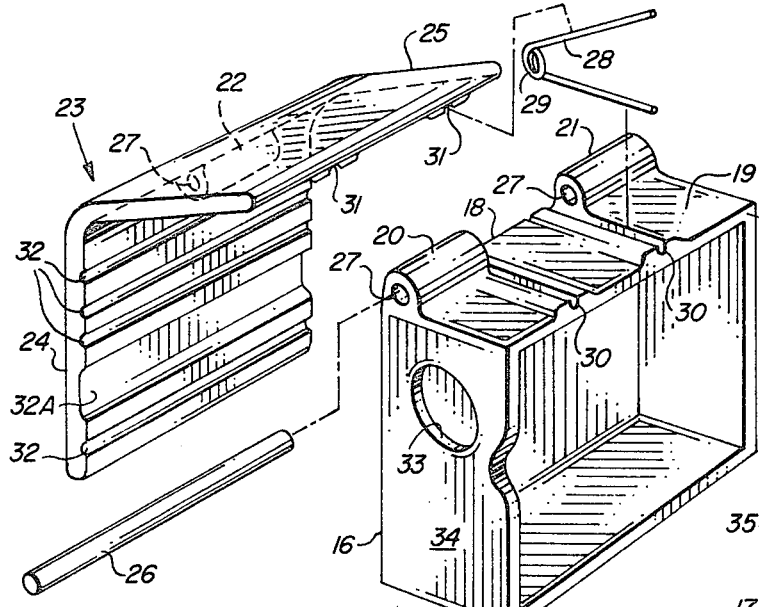
FIG-6
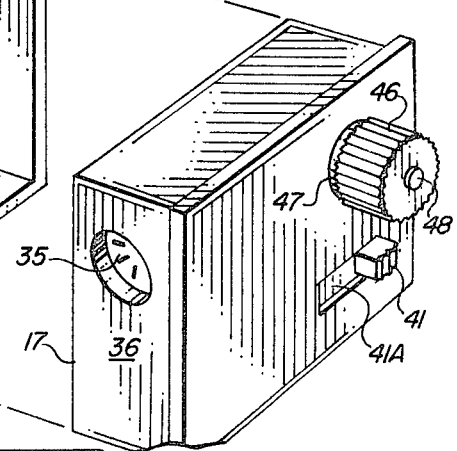

SELF CONTAINED HEAD MOUNTABLE SLEEP INHIBITING DEVICE

BACKGROUND OF THE INVENTION

This invention relates to a head mountable, audible alarm responsive to a nodding or tilting movement of the head of the user and is particularly useful for vehicle drivers, guards and the like.

Although the prior art includes many types of sleep inhibiting devices, all have shortcomings which have made them unacceptable to the using public. Some of the known devices require electrical leads or fixed connections to a battery carried by the clothes of the user. Not only is such an arrangement unsightly, but the electrical wires may accidentally become disconnected from the alarm device or prevent freedom of movement of the user.

Further, most self contained head mounted sleep inhibitors which contained batteries necessary to energize an audible alarm of sufficient volume to be heard and to alert the driver of a noisy truck or the like are too heavy to be worn with comfort. Accordingly, a lightweight, head mountable sleep inhibiting device is needed, the housing of which renders it usable for mounting on the stem of eyeglasses, the rim or band of a hat or any other headgear which contains the necessary batteries to function properly without being too heavy for comfort.

DESCRIPTION OF THE PRIOR ART

U.S. Pat. No. 2,713,159 discloses a sleep inhibiting device utilizing a curved double spring wire which is looped to fit over the crown of the head of a user. The alarm mechanism is secured to one end of the looped wire at the side of the head of the user.

U.S. Pat. No. 2,910,679 discloses a sleep preventing device employing a C-clamp which forms an ear engaging hook. The main length of the clamp embraces the top, rear and bottom of the ear stub of the user and back of the ear wing.

U.S. Pat. No. 3,076,186 discloses a sleep alarm headpiece wherein the housing of the alarm is attached to the visor of a cap and is either an inverted cup shaped container or an elongated container covered by suitable covers.

U.S. Pat. No. 3,208,062 discloses signal devices for alerting purposes which employs a switch housing mounted in and through the crown of a hat or on the stem of an eyepiece with the alarm device positioned in the pocket of the shirt of the user.

U.S. Pat. No. 3,906,478 discloses a sleep preventing device comprising a hollow shallow cylindrical member provided with a clip for detachably securing the member to an ear of a driver.

U.S. Pat. No. 3,999,177 discloses a vehicle operator alert sensor and alarm employing a switch mounted on the hat, ear hook or headband of the user with the battery and alarm enclosed in a casing which may be clipped to the operator's wearing apparel or mounted on the dashboard of a vehicle.

British Pat. No. 716,445, published Oct. 6, 1954, discloses an electrical warning device for drivers of vehicles employing a mercury switch which may be mounted in the temple of spectacles or goggles.

SUMMARY OF THE INVENTION

In accordance with the invention claimed, a new and improved self contained head mountable sleep inhibiting device is provided employing a novel housing for mounting adjacent the ear of a user whether glass, hat or headband mounted with easy accessibility to a battery compartment for servicing.

It is, therefore, one object of this invention to provided a new and improved self contained head mountable sleep inhibiting device.

Another object of this invention is to provide an improved housing for a sleep inhibiting device which renders it easily attachable and removable from the stem of eyeglasses, headgear or headbands without distracting the attention of the user.

A further object of this invention is to provide a housing for an alert device which contains sufficient battery potential to sound an alarm heard over the roar of engine noise of a large truck without inducing weight so that it may be worn near the ear of a user.

A still further object of this device is to provide a housing for an alert device that is compact, light, may be worn near the ear of the user and is quickly adjustable as to the degree of head tilt necessary to place the device in an alarm position.

A still further object of this invention is to provide an alarm device for vehicle drivers, guards and the like which is economical to manufacture, durable in use and refined in appearance.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of the head of a model showing an alert device embodying the invention mounted on a stem of the glasses worn by the model.

FIG. 2 is a perspective view of the head of a model wearing a cap showing the alert device of FIG. 1 mounted on the rim of the cap adjacent the ear of the model;

FIG. 3 is a side view of the alert device shown in FIG. 1 showing the on-off switch and the knob for the tilt adjustment means;

FIG. 4 is a left end view of the alert device shown in FIGS. 1 and 3 showing in dash lines the releasing position of the clamp;

FIG. 5 is a view similar to FIG. 3 with the cover removed;

FIG. 6 is an exploded perspective view of the housing of the alert device shown in FIGS. 1-5; and FIG. 7 is a diagrammatic illustration of the electrical circuitry of the alert device shown in FIGS. 1-6.

DESCRIPTION OF THE PREFERRED EMBODIMENT

Referring more particularly to the drawing by characters of reference, FIG. 1 illustrates an operator 10 which may be a typical vehicle driver or guard whose work depends on being awake and alert. In FIG. 1, the operator 10 is wearing eyeglasses 11 to the stem of which is secured an alarm alert apparatus or device 12 of this invention.

The device 12 may be clipped in the position shown in FIG. 1 to the stem of the eyeglasses or reversed 180 degrees and clipped on the rim 13 of a hat 14 worn by the operator without effecting the operational ability of the alarm alert device. The hat may be lightweight visored cap, as shown, or other headgear worn by a driver, guard or the like.

The alert alarm device 12, as shon in FIG. 6, comprises a housing 15 having two interfitting or telescopic parts 16 and 17 with a box for electrical and mechanical parts of the device shown more clearly in FIGS. 5 and 7. The outer part 16 of the housing 15 is provided along the edge 18 of its top 19 with a pair of spacedly positioned hinge members 20 and 21 which are arranged to have aligned with it a cooperating hinge member 22 mounted on the inside surface of an L-shaped clamp 23 at the intersection of its legs 24 and 25 in the manner shown in FIG. 6.

The clamp 23 is held on part 16 of housing 15 by a rod 26 which passes through like openings 27 extending axially through the hinge members 20, 21 and 22 and held in a biased position by a pair of U-shape springs 28, only one of which is shown in FIG. 6 for clarity purposes. Each spring is retained in spaced position along rod 26 which passes through its looped ring configuration 29 by slots 30 and 31 in the top 19 of part 16 of housing 15 and the inside surface of leg 25 of clamp 23.

As shown in FIG. 6, the inside surface of leg 24 of clamp 23 is provided with a plurality of grooves 32 of different widths extending laterally thereacross, one groove 32A of which is wide enough to receive and hold therein the stem of most eyeglasses, as shown in FIG. 1.

Part 16 of housing 15 is also provided with an aperture 33 provided in its side 34 which is axially aligned with an aperture 35 extending through side 36 of part 17 when the parts are fitted one within the other, as shown in FIGS. 1 and 2. The aligned apertures are positioned adjacent the alarm means 37 mounted in part 16, as shown in FIG. 5.

The parts of the housing may be made of suitable lightweight material, such as plastic, and house the alert alarm device 10. This device comprises the alarm means 37 which is provided with an audible alarm or signal upon the operation thereof for keeping the vehicle driver or guard awake and power means 38 for operating the alarm means. The alarm means 37 may be, for example, a suitable battery operated buzzer and the power means 38 may be, for example, one or more suitable replaceable batteries. The batteries and buzzer are interconnected by electrical wires 39 connecting in series therewith a mercury switch 40 and an on-off manually operable switch 41 which may be used by the user to electrically disconnect the alarm means from the power supply, i.e., batteries. Switch 41 extends through a slot 41A in part 17 of housing 15 for easy access by the user.

The known mercury switch comprises a pair of normally open contacts 42 and 43 and a globule of mercury 44 with the position of the housing 45 of the mercury switch 40 determining its on-off condition.

In order to control the position of housing 45 of mercury switch 40 relative to housing 15, a knob 46 is threadedly connected to housing 45 so that it may tilt the housing of the switch relative to the housing of the alarm device 12 for controlling the amount of angle displacement of the operator's head necessary to cause the globule of mercury to complete the contact between the contacts 42 and 43 of the mercury switch 40 in the usual manner. This knob 46 is mounted in frictional engagement with a suitable plastic washer 47 mounted around a threaded shaft 48 connected to extend laterally from housing 45 of mercury switch 40 through part 17 of the housing 15 of the alert alarm device, as shown in FIGS. 1-4 and 6 of the drawings.

In operation, the alert alarm device 12 is either clamped on a stem of a pair of eyeglasses, as shown in FIG. 1, or to a rim of a hat or headband and adjusted on the head of a user in a head upright position substantially as shown in FIGS. 1 and 2. The switch 41 is then placed in the on position to activate the alarm apparatus. Should the alarm apparatus be activated by the switch 41 to render an audible alarm or signal, the knob 46 is adjusted by turning to tilt the housing 45 of the mercury switch 40 until the alarm means is rendered inoperative with the user's head in the normal position for his activity, such as driving a vehicle. Conversely, should the audible alarm means 37 remain deactivated when the operator's head is nodded forward to the position it would occupy should the operator or user begin to doze or fall asleep, the knob 46 is rotated slightly the other direction to vary the position of the housing 45 of the mercury switch 40.

It should be noted that the clamp 23 makes it possible to readily use the alarm device on eyeglasses or cap with the alarm devices positioned in one position or 180 degrees relative thereto without effecting its operation or sensitivity.

Although but one embodiment of the present invention has been illustrated and described, it will be apparent to those skilled in the art that various changes and modifications beyond those already suggested may be made therein without departing from the spirit of the invention or from the scope of the appended claims.

What is claimed is:

1. A sleep inhibiting device comprising:
   a rectangular housing provided with a clamp hingedly mounted along one of its edges,
   said clamp comprising an L-shaped configuration having one leg lying along one surface of said housing and the other leg lying along another surface of said housing,
   a spring mounted on said housing between one of said legs of said clamp and the outer surface of said housing for biasing one leg of said clamp toward said housing and the other leg of said clamp away from said housing,
   said one leg being adapted to receive and hold between it and the outer surface of said housing an object worn by the user of said device,
   an alarm means mounted in said housing,
   battery means mounted in said housing,
   an electric circuit interconnecting said alarm means in series with said battery means through an on-off switch and an independently adjustable mercury switch,
   said mercury switch comprising a switch housing for forward and rearward angular movement for opening and closing a circuit therein to energize and deenergize said alarm means when said on-off switch is in its on position, and
   knob means mounted on the outside of said housing of the device for adjusting the position of said switch housing relative to said housing of the device, whereby nodding of the user's head will complete the circuit in said mercury switch and energize said alarm means to awaken the user.

2. The sleep inhibiting device set forth in claim 1 wherein:

said one leg of said clamp is provided with at least one groove extending across its surface arranged juxtapositionedly to said outer surface for holding one stem of eyeglasses worn by the user.

3. The sleep inhibiting device set forh in claim 1 wherein:

said rectangular housing comprises two telescopic parts, the outer part of which supports said clamp means.

4. The sleep inhibiting device set forth in claim 1 wherein:

said clamp is hingedly connected to said housing at the intersection of its legs by a piano type hinge.

5. The sleep inhibiting device set forth in claim 1 wherein:

said knob is mounted on the side of said housing opposite to the side of said housing cooperating with said one leg of said clamp.

6. The sleep inhibiting device set forth in claim 5 wherein:

said on-off switch extends through said housing outwardly at a point adjacent said knob.

* * * * *